INVENTOR.
ANTHONY T. ZAPPIA
BY
Harold B. Hood
Attorney

INVENTOR.
ANTHONY T. ZAPPIA
BY
Harold B. Hood
Attorney

Feb. 16, 1965  A. T. ZAPPIA  3,169,846
MACHINE FOR FORMING GLASSWARE
Filed Aug. 17, 1961  5 Sheets-Sheet 3

INVENTOR.
ANTHONY T. ZAPPIA
BY
Harold B. Hood
Attorney

Feb. 16, 1965    A. T. ZAPPIA    3,169,846
MACHINE FOR FORMING GLASSWARE
Filed Aug. 17, 1961    5 Sheets-Sheet 4

INVENTOR.
ANTHONY T. ZAPPIA
BY
Harold B. Hood
Attorney

Feb. 16, 1965  A. T. ZAPPIA  3,169,846
MACHINE FOR FORMING GLASSWARE
Filed Aug. 17, 1961  5 Sheets-Sheet 5
Fig. 12.
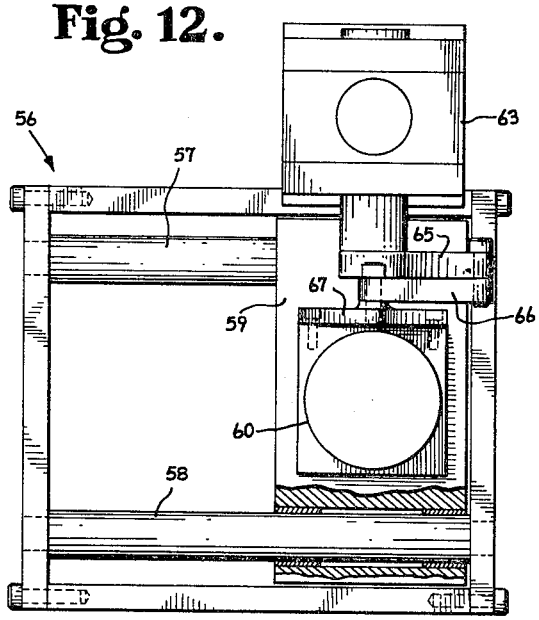
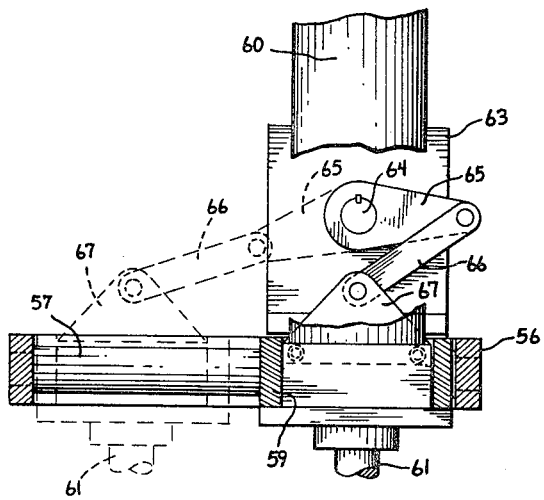
Fig. 11.
INVENTOR.
ANTHONY T. ZAPPIA
BY
Harold B. Hood
Attorney

United States Patent Office 3,169,846
Patented Feb. 16, 1965

3,169,846
MACHINE FOR FORMING GLASSWARE
Anthony T. Zappia, Indianapolis, Ind., assignor, by mesne assignments, to Speedway Machine & Tool Company, Inc., Indianapolis, Ind., a corporation of Indiana
Filed Aug. 17, 1961, Ser. No. 132,067
9 Claims. (Cl. 65—222)

The present invention relates to a machine for forming glassware, and is particularly concerned with the manufacture of blown ware generally in the nature of bottles, jars and similar articles. The primary object of the invention is to provide a novel arrangement and programming of parts whereby a maximum output capacity may be provided in a machine of minimum cost. To that end, I have provided a forming machine comprising two or more parison molds arranged to move concurrently between a charging station and two or more alternatively-activated pressing stations, a single press plunger movable between the press stations for coaction, there, with the individual parison molds, a number of neck or finish rings equal to the number of pressing stations for forming finishes on parisons at the respective pressing stations and for transporting parisons from the individual pressing stations, and a single blow mold to which parisons are so transported by the several neck rings and in which the parisons are successively blown to final form.

A further object of the invention is to provide mechanism of the character above described in which the parisons are not inverted during transportation between the parison molds and the blow mold.

A still further object of the invention is to provide mechanism whereby the individual finish rings travel alternately between their respective parison molds and the single blow mold.

Still a further object of the invention is to provide, in a machine of the character described, such an arrangement of parts that, while a parison is being formed in one parison mold, a charge of molten glass is being delivered to another parison mold, and as the newly-charged mold is moving to its pressing station, the mold from which a newly formed parison has just been removed will be shifted to the charging station to receive a new charge of molten glass.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

FIG. 11 is a fragmentary, front elevation of the press plunger operating means, parts being shown in section and other parts being broken away for clarity of illustration; and FIG. 12 is a top plan view of the mechanism illustrated in FIG. 11, parts being shown in section.

Figure 1:
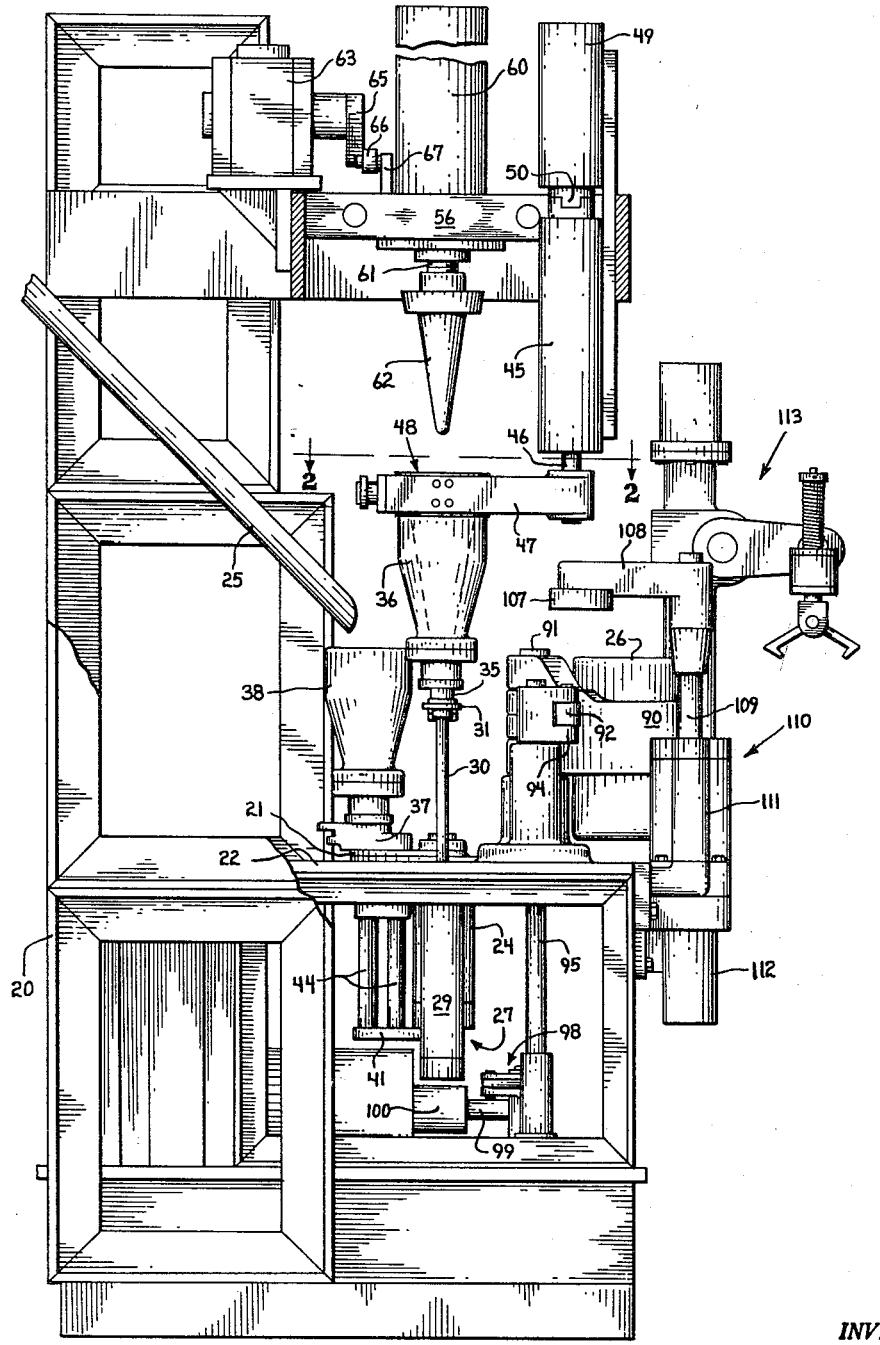
FIG. 1 is a side elevation of a machine constructed in accordance with the present invention.

Referring more particularly to the drawings, it will be seen that I have illustrated a machine comprising a frame 20 upon which is supported, for oscillation in a horizontal plane, a table or oscillator 21 which rests upon a plate 22 fixed to the frame and is carried by a suitably-journalled shaft 23. An oscillatory fluid motor 24 is arranged to drive the shaft 23 and table 21.

A charging chute 25, fed at suitable intervals by conventional means from a pool of molten glass (not shown) is arranged at a suitable point adjacent the peripheral path of the oscillator 21. A blow mold, indicated generally by the reference numeral 26, is arranged closely adjacent the peripheral path of the oscillator 21 at a point diametrically opposite the charging chute 25.

Separate elevator mechanisms, indicated generally by the reference numerals 27 and 28, are arranged closely adjacent the peripheral path of the table 21 at points allochirally angularly spaced from the charging chute 25, for a purpose which will appear.

The elevator mechanism 27 comprises a fluid motor cylinder 29 suitably supported from the plate 22 and a piston rod 30 terminating at its upper end in an enlarged head 31. Similarly, the elevator mechanism 28 comprises a fluid motor cylinder 32 suitably supported from the plate 22 and a piston rod 33 terminating in an enlarged head 34.

A platform 35 carried by the table 21 near its periphery supports a first parison mold 36; and a similar platform 37 supports a second parison mold 38, said molds being angularly separated by a dimension equal to the separation between the charging chute 25 and the elevator mechanism 27. As a consequence, it will be apparent that, when the mold 38 is in registry with the charging chute 25, as illustrated in solid lines in FIG. 3, the mold 36 will be positioned in cooperative association with the elevator mechanism 27; and when the mold 36 is in registry with the charging chute 25, the mold 38 will be positioned in cooperative association with the elevator mechanism 28, as indicated in broken lines in FIG. 3.

Figure 5:
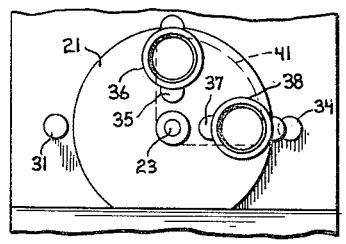
FIG. 5 is a plan view taken substantially on the line 5—5 of FIG. 3 but showing the parts in a different position within the cycle of the machine.

Two or more guide rods 39 are fixed to the platform 35, depend therefrom and are slidably received in guide tubes 40 which are fixed to the table 21 and to a sector plate 41 which is secured to the lower end of the shaft 23. The platform 35 is formed with a notch 42 which, when the parts are in the positions shown in solid lines in FIG. 3, operatively receives a portion of the enlarged head 31 of the piston rod 30 of the elevator mechanism 27. The platform 37 is formed with a similar notch which, when the parts are in the positions of FIGS. 5 and 6, operatively receives a portion of the enlarged head 34 of the piston rod 33 of the elevator mechanism 28; and the platform 37 is provided with guide rods 43 similar to the guide rods 39 and similarly received in guide tubes 44 similar to the guide tubes 40.

Figure 3:
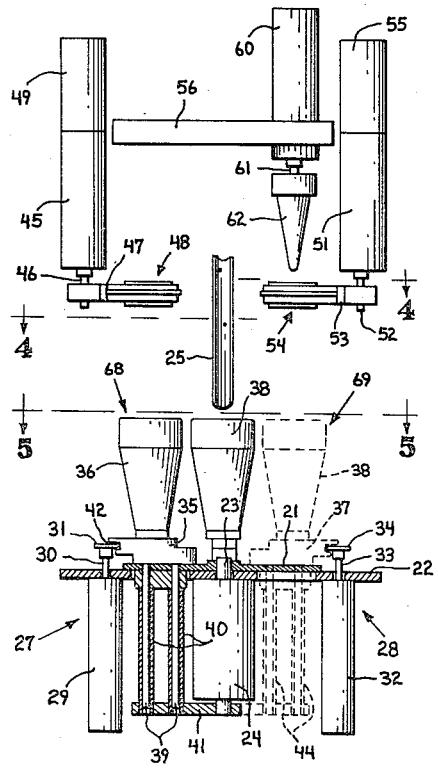
FIG. 3 is a fragmentary, somewhat diagrammatic, front elevation of the parison molds, the forming plunger and the finish rings, together with their actuating mechanisms, drawn to a reduced scale and showing the parts substantially in the positions of FIG. 1.

A reciprocatory fluid motor 45 is suitably journalled in the machine frame 20 for oscillation about an axis equidistant from the blow mold 26 and from the location of the mold 36 illustrated in FIG. 3. Said motor 45 includes a piston rod 46, rotationally fixed with respect to its cylinder, and carrying a finish ring arm 47 which suspends a finish ring, indicated generally by the reference numeral 48, at a level above the molds 36 and 38. An oscillatory fluid motor 49 has a key connection 50 with the motor 45 whereby operation of the motor 49 will turn the motor 45, and with it the arm 47 through a path which shifts the ring 48 between a position registering with the location of the mold 36 as illustrated in FIG. 3 and a position registering with the blow mold 26.

A similar motor 51 is similarly mounted for oscillation about an axis equidistant from the blow mold 26 and from the location of the parison mold 38 illustrated in broken lines in FIG. 3. The piston rod 52 of the motor 51 carries a finish ring arm 53 from which is similarly suspended a second finish ring indicated generally by the reference numeral 54; and an oscillatory fluid motor 55 is similarly connected to the motor 51 to swing the ring 54 between a position registering with the location of the mold 38 illustrated in broken lines in FIG. 3 and a position registering with the blow mold 26.

Suspended above the rings 48 and 54 is an auxiliary frame 56 including a pair of parallel guide rods 57 and 58 upon which is slidably mounted a press plunger carriage 59. Supported upon the carriage 59 is a reciprocatory fluid motor 60 whose piston rod 61 carries a press plunger 62. Fixed to the frame 56 is an oscillatory fluid motor 63 whose output shaft 64 carries a lever 65 connected, by a link 66, with an anchorage 67 on the carriage 59. The parts just described are so proportioned and designed that, when they are in the positions illustrated in solid lines in FIGS. 11 and 12, the plunger 62 registers with the position of the ring 54 and the mold 38 illustrated in broken lines in FIG. 3, and when the parts are in the positions illustrated in broken lines in FIG. 11, the plunger 62 registers with the ring 48 and the position of the mold 36 illustrated in solid lines in FIG. 3.

Alternatively, of course, separate press plunger assemblies such as 60, 61 and 62 might be stationarily mounted at the separate pressing stations.

The position of the mold 36 illustrated in solid lines in FIG. 3 may be referred to as a first pressing station 68; the position of the mold 38 illustrated in broken lines in FIG. 3 may be referred to as a second pressing station 69 and the position of the mold 38 illustrated in solid lines in FIG. 3 may be referred to as a charging station 70.

In the operation of the machine it is necessary, of course, periodically to open and close the finish rings 48 and 54. The means for thus operating said rings is illustrated in detail in FIG. 2. Since the said rings and their operating means are identical, only one such means has been illustrated in detail and will be described.

A block 71 is suitably fixed to the arm 53 and has, at each end, a reduced extension such as that illustrated at 72. A reverse flange 73 at the inner end of an element 73' is snugly slidably sleeved on said extension 72 and said element 73' is suitably fixed to a piston 74. A cap 75 is formed with an inturned sleeve 76 which is threadedly and adjustably secured to the extremity of the extension 72; and a coiled spring 77 is confined between the elements 73' and 75, its opposite ends being received in cups defined by the flanges 73 and 76. One jaw 78 of the ring 54 is carried by the piston 74 and the other jaw 80 of said ring is carried by a similar piston 79 similarly associated with the opposite end of the block 71. An air supply passage 81 leads through the arm 53 and enters the block 71 where it branches to form a passage 82 leading to the piston 74 and a branch 83 leading to the piston 79. When air under pressure is supplied to the branches 82 and 83, the pistons 74 and 79 will be moved outwardly to open the ring 54, and when the passage 81 is exhausted, the spring 77 and its counterpart will return the pistons to close the ring 54.

Figure 7:
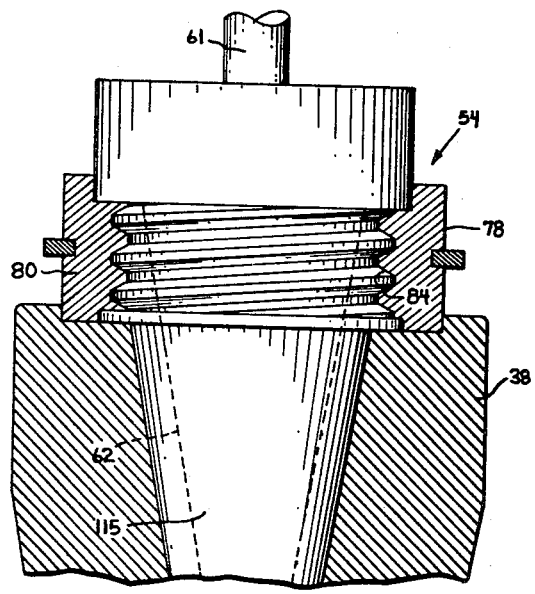
FIG. 7 is an enlarged, fragmentary section taken substantially on the line 7—7 of FIG. 6.

As is illustrated most clearly in FIG. 7, the rings 48 and 54 are internally suitably formed, as at 84, to provide the desired finish on the ware being produced.

The arm 47 carries a similar assembly including a piston 85 controlling one jaw 86 of the ring 48 and a piston 87 controlling the other jaw 88 of said ring.

Figure 2:
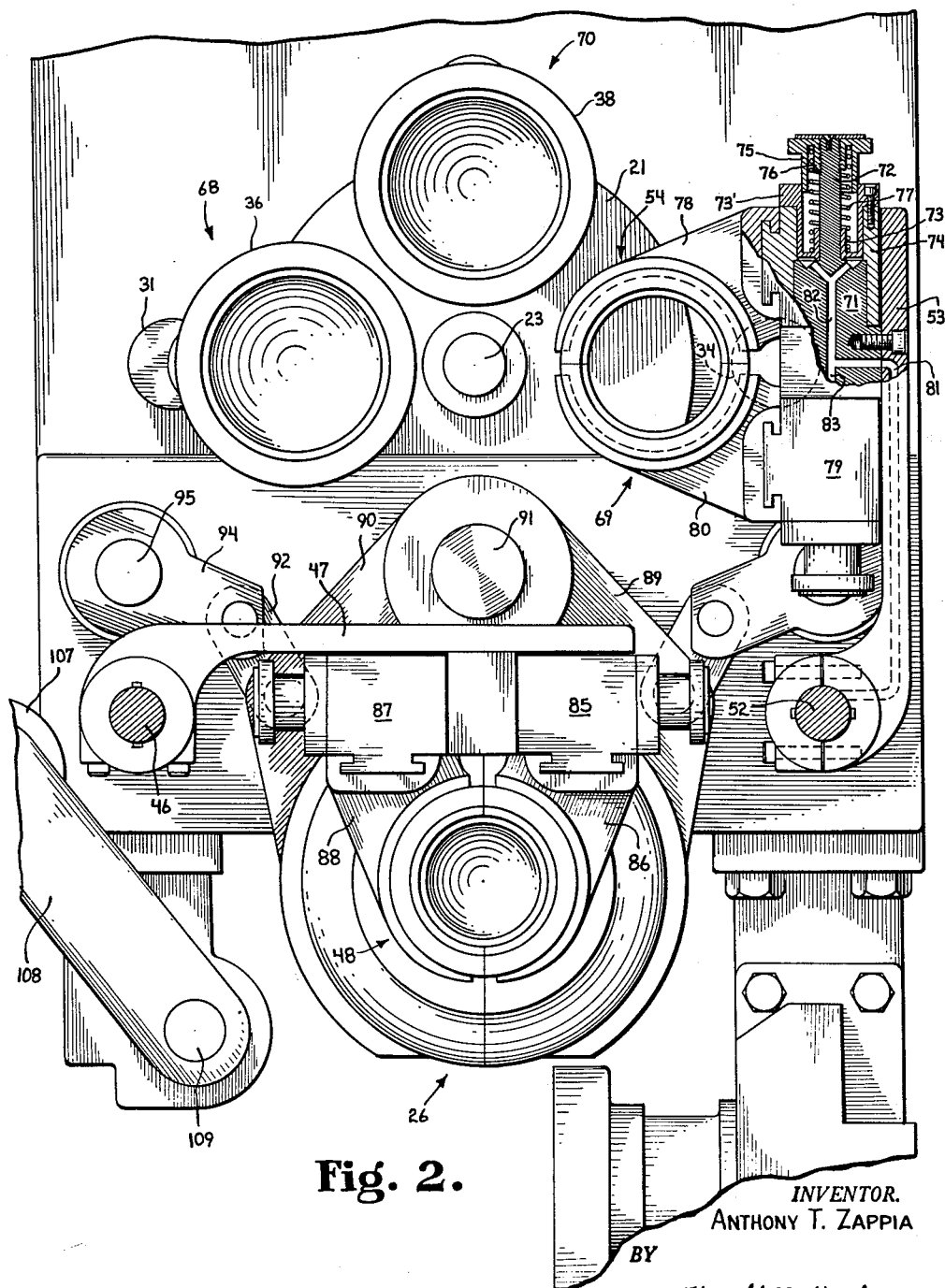
FIG. 2 is a fragmentary plan view, drawn to an enlarged scale, and taken substantially on the line 2—2 of FIG. 1.
Figure 4:
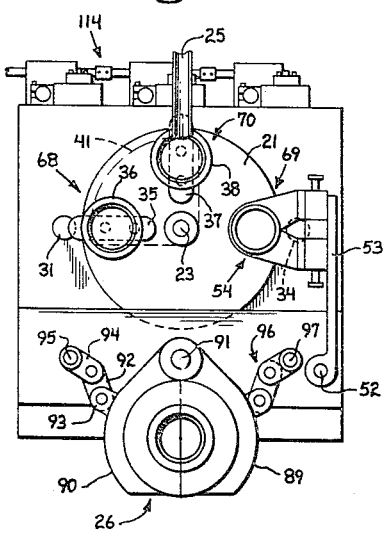
FIG. 4 is a plan view taken substantially on the line 4—4 of FIG. 3.
Figure 9:
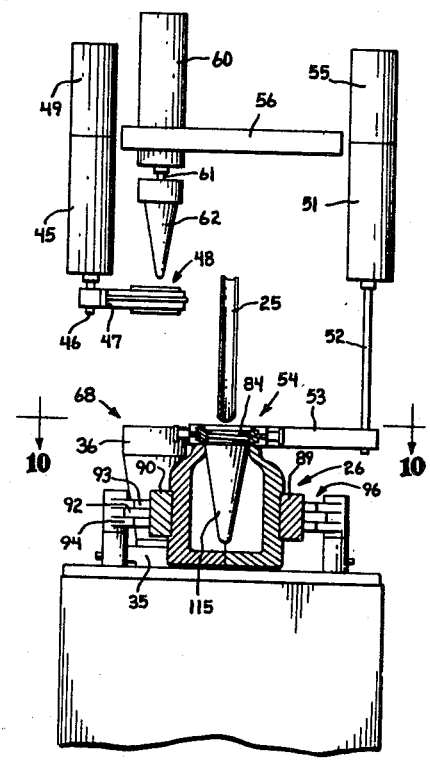
FIG. 9 is a front elevation of the machine, showing the blow mold in vertical section, the newly-formed parison in position therein and showing the press plunger in position for cooperation with the other parison mold.

As is most clearly shown in FIGS. 2, 4 and 9, the blow mold 26 comprises mating jaws 89 and 90 mounted to swing about a common axis 91. A link 92 is connected at one end to an ear on the jaw 90 and at its other end to a lever 94 fixed to a rock shaft 95 suitably journalled in the machine frame 20. A similar link-lever system 96 operatively connects the other jaw 89 of the blow mold to a second rock shaft 97. Through a suitable linkage 98, the rock shafts 95 and 97 are oscillatable in opposite directions by reciprocation of the piston rod 99 of a reciprocatory motor 100. Thus, when the piston rod 99 is advanced, the shaft 95 is turned in a clockwise direction and the shaft 97 is turned in a counter-clockwise direction, as viewed in FIG. 4, to close the jaws 89 and 90; and when the piston rod 99 is retracted, the shafts 95 and 97 are turned in the opposite directions to open the blow mold jaws.

A blow head 107 is carried by an arm 108 fixed to the piston rod 109 of a reciprocatory fluid motor 110 whose cylinder 111 is suitably journalled in the machine frame of oscillation about a vertical axis under the influence of an oscillatory fluid motor 112. Thus, by operation of the motor 112, the arm 108 may be shifted between its position illustrated in FIG. 2 and a position in registry with the blow mold; and by operation of the motor 110, the blow head 107 may be moved downwardly into sealing association with the finish of a parison disposed within the blow mold 26 to complete the formation of the piece.

Take-out means, indicated generally by the reference numeral 113, may be of any suitable construction and is operable, after completion of the piece and return of the blow head to the position of FIG. 2, to lift the piece out of the opened blow mold and deposit it upon a take-off conveyor or at any other desired point.

*Operation*

With the parts in the positions illustrated in solid lines in FIG. 3, a measured quantity of molten glass is fed through the chute 25 to the mold 38. Thereupon, the motor 24 is activated to shift the table 21 in a clockwise direction as viewed in FIG. 2 until the mold 38 reaches the pressing station 69 and the mold 36 concurrently reaches the charging station 70. As the mold 38 reaches the station 69, the notch in its platform 37 operatively engages the head 34.

Figure 6:
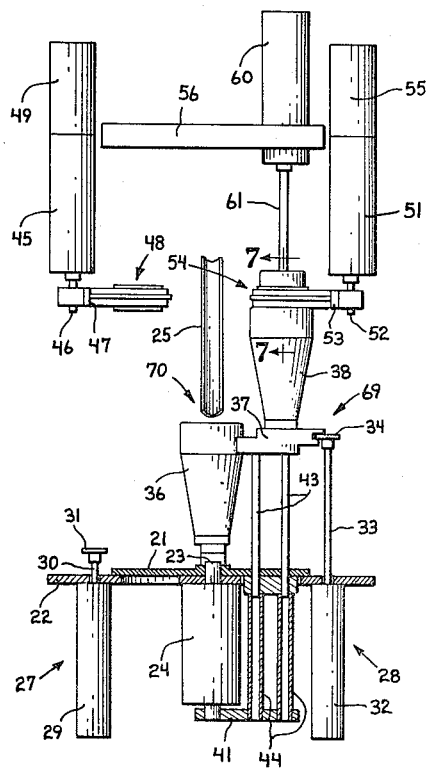
FIG. 6 is a view similar to FIG. 3 but showing the parison molds in the locations of FIG. 5 and with one of those molds raised and the press plunger projected into parison-pressing relation therewith.

Through suitable timing means, which is merely suggested and indicated generally by the reference numeral 114 in FIG. 4, the elevator mechanism 28 is now activated to project its piston rod 33, thus lifting the platform 37 and the mold 38 to the position of FIG. 6. As is indicated in FIG. 7, the ring 54 thus takes a sealing seat in the upper end of the mold 38. Now, the motor 60 is activated to project its piston rod 61, thus forcing the plunger 62 through the ring 54 and into the mold 38 where it engages the charge of molten glass in the mold and forces it to occupy the space between the plunger and the interiors of the mold 38 and the ring 54 to produce the parison 115 having the designed finish.

Figure 8:
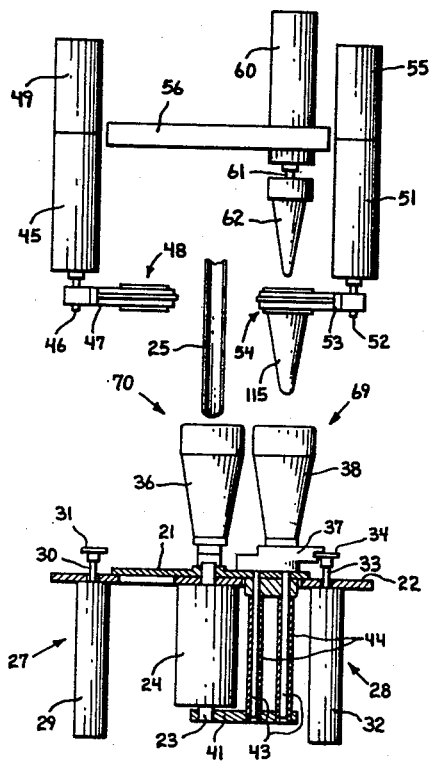
FIG. 8 is a view similar to FIG. 6 but showing both parison molds in lowered position, the press plunger withdrawn and the newly-formed parison suspended from its neck ring.

Now, the plunger 62 is retracted and the elevator mechanism 28 is lowered whereby the mold 38 and the plunger 62 leave the parison 115 suspended from the ring 54 in the manner illustrated in FIG. 8. Meantime, a charge of molten glass has been deposited through the chute 25 in the mold 36.

Figure 10:
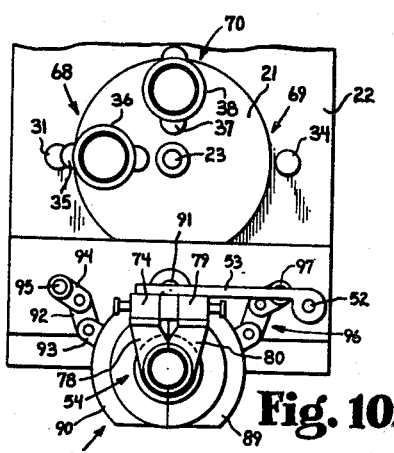
FIG. 10 is a plan view taken substantially on the line 10—10 of FIG. 9.

Now, the motor 24 is activated to return the table 21 from the position of FIG. 8 to the solid line position of FIG. 3. At the same time, the motor 55 is activated to swing the arm 53 from its position illustrated in FIG. 2 to its position illustrated in FIG. 10 and the motor 51 is activated to project its piston rod 52, thereby lowering the parison 115 into the opened blow mold 26. The motor 100 is now activated to close the blow mold 26 and air is supplied to the passage 81 to open the finsh ring 54, leaving the parison suspended from its finish within the closed blow mold. The finish ring 54 is now lifted and returned to its position of FIG. 2, the blow head 107 is moved into cooperative engagement with the parison in the blow mold and the piece is blown to finished form. Meantime, the plunger carriage 59 has been moved to the position of FIG. 9, the elevator mechanism 27 has been actuated to lift the mold 36 into cooperative engagement with the ring 48 and the plunger 62 has been advanced to form a parison within the mold 36 and the ring 48.

As the blow mold 26 is opened, the take-out mechanism 113 is activated to lift the finished piece from the opened blow mold and deposit it at a suitable point.

It will be seen that the arm 53 and the arm 47 alternately move into and out of registery with the blow mold, that the plunger 62 moves alternately into registry with the finish rings and their respective parison molds, that the parison molds move alternately into registry with the charging station and that time for reheat of the parisons, as they are suspended from their respective rings 48 and 54, is provided before they are deposited successively in the blow mold. It will also be apparent that, since the press plunger and the elevator mechanisms are actuated by motors which are independent of the motors whereby the parisons are transferred to the blow mold, suitable adjustments within the timing mechanism 114 provide for a relatively wide range of variation in the reheat time which may be provided for the parisons.

While any suitable timing mechanism for the machine may be used, I prefer the specific form of mechanism suggested at 114 in FIG. 4, which form constitutes the subject matter of my copending application Serial Number 138,050, filed September 14, 1961, now Patent No. 3,098,505, issued July 23, 1963.

I claim as my invention:

1. In a machine of the class described, a table mounted for oscillation about a substantially vertical axis, a first parison mold and a second parison mold supported to move with said table at equal radial distances from said axis, a charging station, a blow mold stationarily mounted adjacent said table, a press plunger carriage mounted above said table to travel between separate pressing stations equally and oppositely spaced from said charging station, a press plunger carried by said carriage and vertically reciprocable into and out of cooperative relation with said parison molds, a first finish ring, a second finish ring, means mounting said first finish ring for movement between registry with said blow mold and registry with one of said pressing stations, means mounting said second finish ring for movement between registry with said blow mold and registry with the other of said pressing stations, means for oscillating said table between a position in which said first parison mold registers with said one pressing station while said second parison mold registers with said charging station and a position in which said second parison mold registers with said other pressing station while said first parison mold registers with said charging station, means for driving said press plunger carriage and effective to position said plunger in registry with either of said parison molds when the latter is in registry with a pressing station, and means for driving said finish rings and effective to position said first finish ring in registry with said one pressing station and said second finish ring in registry with said blow mold when said first parison mold is in registry with said one pressing station and to position said second finish ring in registry with said other pressing station and said first finish ring in registry with said blow mold when said second parison mold is in registry with said other pressing station.

2. In a machine of the class described, a pair of arms mounted for reciprocation and for arcuate oscillation about individual, spaced, axes which are parallel with the direction of such reciprocation, a finish ring carried by each arm, a single mold means equidistantly spaced radially from said individual axes, two additional mold means spaced from each other and each spaced radially from one only of said axes by a distance equal to the distance between said single mold means and each of said axes, and means for driving said arms, said driving means being so constructed and arranged that, when either of said finish rings registers with said single mold means, the other of said finish rings registers with its respective additional mold means.

3. In a machine of the class described, a pair of arms mounted for reciprocation and for arcuate oscillation about individual, spaced, axes which are parallel with the direction of such reciprocation, a finish ring carried by each arm, a single blow mold equidistantly spaced radially from said individual axes, two parison molds spaced from each other and each spaced radially from one only of said axes by a distance equal to the distance between said blow mold and each of said axes, means for driving said arms between alternating registry with said blow mold and registry with their respective parison molds, and means for closing each finish ring when in registry with its parison mold and opening each finish ring when in registry with said blow mold.

4. In a machine of the class described, a charging station, two parison molds, means for moving said molds first in one direction to place one of said molds in registry with said charging station and the other in registry with a first pressing station and then in the opposite direction to place the other of said molds in registry with said charging station and said one mold in registry with a second pressing station, a carriage mounted for movement between registry with said first pressing station and registry with said second pressing station, elevator means at each of said pressing stations, each such elevator means engaging a parison mold only when the latter is in registry with its respective pressing station to elevate said parison mold toward said carriage, a press plunger carried by said carriage, a pair of arms, each mounted for oscillation about an individual axis, said axes being equidistantly spaced, respectively, from said respective pressing stations, a finish ring carried by each arm, each finish ring being movable, with its arm, into and out of registry with its respective pressing station, a single blow mold equidistantly spaced from said axes by a distance equal to the distance between each such axis and its respective pressing station, means carried by said carriage for advancing said plunger, when in registry with a parison mold and a finish ring at either pressing station, through that finish ring and into that parison mold to form a parison and then retracting said plunger, means for lowering said elevator means, after retraction of said plunger, means for moving that finish ring, after said elevator means is lowered, into registry with said blow mold to deposit said parison in said blow mold, means effective after retraction of said plunger to shift said parison molds, said plunger carriage and the other of said finish rings, means for opening said one finish ring after deposit of said parison in said blow mold, means for thereupon shifting said one finish ring out of registry with said blow mold, a blow head, and means for moving said blow head into cooperative registry with said blow mold after removal of said one finish ring.

5. In a machine of the class described, an oscillator mounted for movement about a substantially vertical axis, two parison molds carried on said oscillator at angularly spaced points, a charging station at a point adjacent the peripheral path of said oscillator, a blow mold adjacent the peripheral path of said oscillator at a point diametrically opposite said charging station, two pressing stations adjacent the peripheral path of said oscillator and allochirally spaced from said charging station, an elevator assembly at each pressing station, a first arm mounted for resiprocation and oscillation about an axis equidistant from said blow mold and one of said pressing stations, a first finish ring carried by said arm and movable therewith between elevated registration with said one pressing station and depressed registration with said blow mold, a second arm mounted for reciprocation and oscillation about an axis equidistant from said blow mold and the other of said pressing stations, a second finish ring carried by said second arm and movable therewith between elevated registration with said other pressing station and depressed registration with said blow mold, means for moving said oscillator between a position in which one of said parison molds is in registry with said charging station and the other parison mold is operatively engaged by the elevator assembly at one of said pressing stations and a position in which said other parison mold is in registry with said charging station and said one parison mold is operatively engaged by the elevator assembly at the other pressing station, a press plunger carriage suspended above said parison molds, a press plunger mounted on said carriage, means for moving said carriage between a position in which said plunger registers with said one pressing station and a position in which said plunger registers with said other pressing station, means for actuating each elevator mechanism, when engaged with a parison mold, to lift said mold toward said plunger, means mounted on said carriage to advance said plunger through a finish ring into a parison mold, when in registry therewith, to form a parison and thereafter to retract said plunger, means for retracting said elevator mechanism, means effective thereafter to shift the corresponding finish ring into registry with said blow mold, and means effective after retraction of said elevator mechanism to shift said oscillator.

6. In a machine of the class described, a charging station, two pressing stations allochirally spaced from said charging station, an elevator assembly at each pressing station, two parison molds spaced from each other, means for moving said molds concurrently between positions in which one of said molds registers with said charging station and the other mold is operatively engaged by the elevator mechanism at one of said pressing stations, and positions in which said other mold registers with said charging station and said one mold is operatively engaged by the elevator mechanism at the other of said pressing stations, a single blow mold, a first arm mounted for reciprocation and oscillation about an axis equidistant from said blow mold and one of said pressing stations, a first finish ring carried by said arm and movable therewith between elevated registration with said one pressing station and depressed registration with said blow mold, a second arm mounted for reciprocation and oscillation about an axis equidistant from said blow mold and the other of said pressing stations, a second finish ring carried by said second arm and movable therewith between elevated registration with said other pressing station and depressed registration with said blow mold, a press plunger carriage suspended above said parison molds, a press plunger mounted on said carriage, means for moving said carriage between a position in which said plunger registers with said one pressing station and a position in which said plunger registers with said other pressing station, means for actuating each elevator mechanism, when engaged with a parison mold, to lift said mold toward said plunger, means mounted on said carriage to advance said plunger through a finish ring into a parison mold, when in registry therewith, to form a parison and thereafter to retract said plunger, means for retracting said elevator mechanism, means effective thereafter to shift the corresponding finish ring into registry with said blow mold, and means effective after retraction of said elevator mechanism to shift said parison molds.

7. In a machine of the class described, a charging station, two pressing stations allochirally spaced from said charging station, two parison molds spaced from each other, means for moving said molds concurrently between positions in which one of said molds registers with said charging station and the other mold registers with one of said pressing stations, and positions in which said other mold registers with said charging station and said one mold registers with said other pressing station, a pair of arms mounted for reciprocation and oscillation relative to individual, spaced, parallel axes, a finish ring carried by each arm, a single blow mold equidistantly spaced from said axes by a dimension equal to the spacing of each axis from its respective pressing station, and means for driving said arms, said mold moving means and said driving means being so constructed and arranged that, when said one parison mold is registry with its respective pressing station the corresponding finish ring is likewise in registry with that pressing station, said other parison mold is in registry with the charging station and the other finish ring is in registry with said blow mold, and when said other parison mold is in registry with its respective pressing station the corresponding finish ring is likewise in registry with that pressing station, said one parison mold is in registry with the charging station and said one finish ring is in registry with said blow mold.

8. In a machine of the class described, a table mounted for oscillation about a substantially vertical axis, a first parison mold and a second parison mold supported to move with said table at equal radial distances from said axis, a charging station, a blow mold stationarily mounted adjacent said table, press plunger means arranged for coaction with said parison molds at separate pressing stations equally and oppositely spaced from said charging station, a first finish ring, a second finish ring, means mounting said first finish ring for movement about an axis parallel with said table axis between registry with said blow mold and registry with one of said pressing stations, means mounting said second finish ring for movement about a further axis parallel with said table axis between registry with said blow mold and registry with the other of said pressing stations, means for oscillating said table about said first-named vertical axis between a position in which said first parison mold registers with said one pressing station while said second parison mold registers with said charging station and a position in which said second parison mold registers with said other pressing station while said first parison mold registers with said charging station, and means for driving said finish rings and effective to position said first finish ring in registry with said one pressing station and said second finish ring in registry with said blow mold when said first parison mold is in registry with said one pressing station and to position said second finish ring in registry with said other pressing station and said first finish ring in registry with said blow mold when said second parison mold is in registry with said other pressing station.

9. In a machine of the class described, a charging station, two pressing stations allochirally spaced from said charging station, an elevator assembly at each pressing station, two parison molds spaced from each other, means for moving said molds concurrently between positions in which one of said molds registers with said charging station and the other mold is operatively engaged by the elevator mechanism at one of said pressing stations, and positions in which said other mold registers with said charging station and said one mold is operatively engaged by the elevator mechanism at the other of said pressing stations, a single blow mold, a first arm mounted for reciprocation and oscillation about an axis equidistant from said blow mold and one of said pressing stations, a first finish ring carried by said arm and movable therewith between elevated registration with said one pressing station and depressed registration with said blow mold, a second arm mounted for reciprocation and oscillation about an axis equidistant from said blow mold and the other of said pressing stations, a second finish ring carried by said second arm and movable therewith between elevated registration with said other pressing station and depressed registration with said blow mold, press plunger means mounted for coaction with said respective parison molds at said respective pressing stations, means for actuating each elevator mechanism, when engaged with a parison mold, to lift said mold toward said plunger means, means to advance said plunger means through a finish ring into a parison mold when said ring and mold are in registry at a pressing station, to form a parison and thereafter to retract said plunger means, means for retracting said elevator mechanism, means effective thereafter to shift the corresponding finish ring into registry with said blow mold to enter the suspended parison in said blow mold, and means effective after retraction of said elevator mechanism to shift said parison molds.

References Cited in the file of this patent

UNITED STATES PATENTS

| | | |
|---|---|---|
| 1,944,844 | Peiler et al. | Jan. 23, 1934 |
| 2,034,844 | Soubier | Mar. 24, 1936 |

FOREIGN PATENTS

| | | |
|---|---|---|
| 108,351 | Great Britain | Aug. 1, 1917 |

UNITED STATES PATENT OFFICE
CERTIFICATE OF CORRECTION

Patent No. 3,169,846 February 16, 1965

Anthony T. Zappia

It is hereby certified that error appears in the above numbered patent requiring correction and that the said Letters Patent should read as corrected below.

Column 8, line 15, before "registry" insert -- in --.

Signed and sealed this 13th day of July 1965.

(SEAL)
Attest:

ERNEST W. SWIDER
Attesting Officer

EDWARD J. BRENNER
Commissioner of Patents